Feb. 5, 1924.
J. A. MILLIKEN
1,482,760
METHOD OF MOLDING GLASSWARE
Filed Aug. 9, 1922
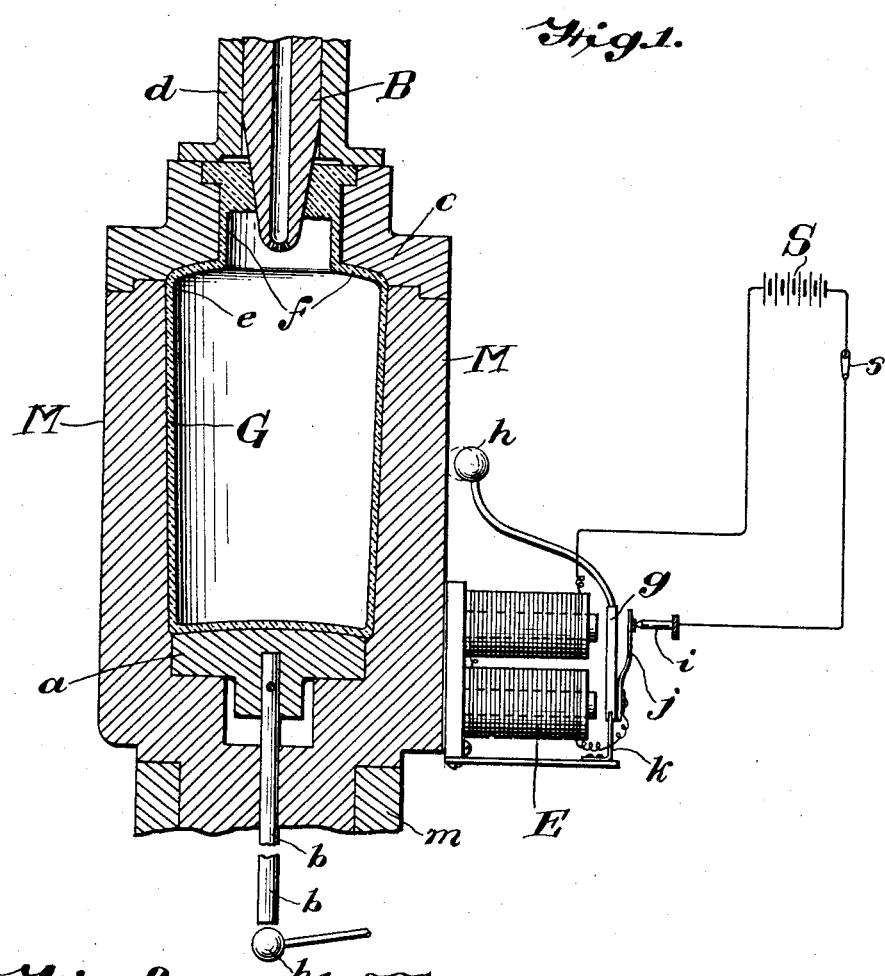
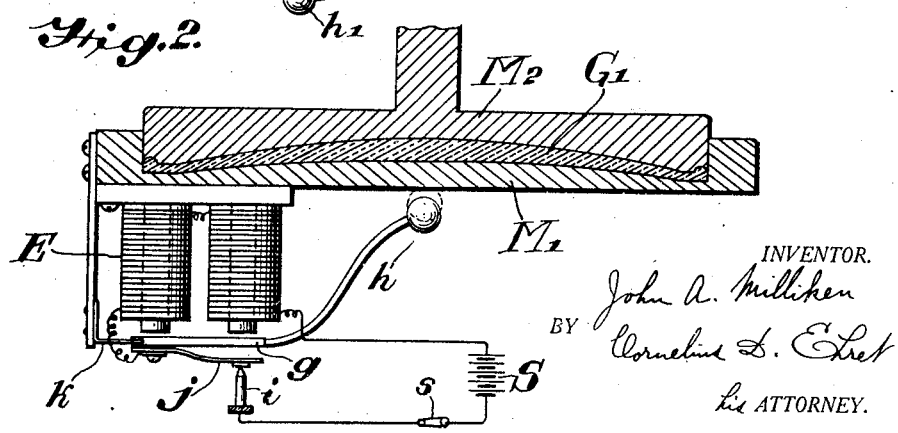
INVENTOR.
John A. Milliken
BY Cornelius L. Ehret
his ATTORNEY.

Patented Feb. 5, 1924.

1,482,760

UNITED STATES PATENT OFFICE.

JOHN A. MILLIKEN, OF BAYONNE, NEW JERSEY, ASSIGNOR TO JOHN E. MARSDEN, OF PHILADELPHIA, PENNSYLVANIA.

METHOD OF MOLDING GLASSWARE.

Application filed August 9, 1922. Serial No. 580,603.

*To all whom it may concern:*

Be it known that I, JOHN A. MILLIKEN, a citizen of the United States, residing in Bayonne, county of Hudson, State of New Jersey, have invented certain new and useful Improvements in Methods of Molding Glassware, of which the following is a specification.

My invention relates to a method of molding articles of glass, either solid or hollow.

In accordance with my invention, a mass of molten glass is introduced into a mold of any suitable type and caused, by pressing, blowing or other action, to fill or take the form of the mold and thereby acquire the desired form, and vibrating or tapping the mold throughout the molding operation or any desired or suitable part thereof to prevent adhesion of the glass to the mold and for other purposes.

I have found that by vibrating the mold, as by applying thereto taps or blows in preferably rapid succession, the mold may be operated at higher temperature and may be continuously used without setting aside for cooling, either natural or forced; and in general, by so vibrating or tapping the mold there is obviated the necessity for control or regulation of its temperature.

Besides making possible the utilization of a mold as rapidly as it can be filled and emptied in the production of a succession of glass articles. the vibration or tapping of the mold has a further advantage in that at the higher temperature at which the mold is worked the article at its mold-engaging surfaces is less streaked and of higher finish or polish.

In accordance with my invention, the mold may be continuously utilized, though it attains a temperature coresponding with dull red heat, which serves to enhance the finish or smoothness of the article.

My invention resides in the method of the character hereinafter described and claimed.

For an illustration of one of many modes of practicing my invention, reference is had to the accompanying drawing, in which:

Fig. 1 is a sectional view of a blow mold provided with means for vibrating or tapping it.

Fig. 2 is a sectional view of a pressing mold provided with means for vibrating or tapping it.

Referring to Fig. 1, M is a metal mold, either in one piece or split, as well understood in the art. in which is blown, by air delivered through the blow pipe B, the hollow glass article G whose lower end is formed by contact with the bottom member $a$ supported upon the rod or stem $b$, the latter held or supported by any suitable means, not shown. The upper portion of the article G is formed by contact with the top mold member or closure $c$ held upon the mold M by the hollow or tubular pressure member $d$, through which extends the aforesaid blow pipe B.

In the example illustrated, the article G is a bottle, or in the nature of a bottle for later severance at approximately the point $e$ of the extension $f$, by which the article may be held in a chuck or the like, as described in my co-pending application Ser. No. 459,651.

Secured upon the mold M itself, or supported upon any other suitable structure, is the vibrating mechanism, which may be of any suitable type, as a vibrator actuated by fluid pressure, as steam or air, or, as indicated, by electric current. In the example illustrated. the vibrator comprises the electro-magnet E, whose armature $g$ carries at its end the weight or hammer $h$. The windings of the electro-magnet E are connected in circuit with the source of current or battery S, switch $s$, stationary contact $i$ and contact $j$ movable with the armature $g$. Upon closure of the switch $s$ the magnet E is energized, attracting the armature $g$, causing the hammer $h$ to strike a blow against the mold M. Immediately the armature $g$ is attracted, the circuit is interrupted between the contacts $i$ and $j$, and the armature $g$ is restored to normal position by its spring mounting $k$. The circuit is again closed, and the operation is repeated in rapid succession, effecting application to the mold M of hammer blows in rapid succession, to effect the above mentioned vibration or tapping of the mold M.

The mold M being so vibrated or tapped, its inner surface which contacts with the glass article G is constantly in vibration, preventing sticking of the glass to the mold M, though the latter be at high temperature, and the outer surfaces of the article G partake of smoother finish.

By so vibrating or tapping the mold M, it need not be cooled and its temperature need not be so closely controlled or regulated and there is no adhesion of the glass to the mold. Immediately the molding operation is completed, the article G is removed, as by lowering the member m which supports the mold M, the bottom a remaining in the position indicated, and the closure member c, which is preferably split, is removed, and the article G as a whole removed.

Without setting the mold aside for cooling, and without supplanting it by a cool mold, as has been common practice heretofore, the same mold M is immediately again utilized by introduction of a mass of molten glass and then blown to fill the mold. Starting with the mold M cold, it soon attains a high temperature, after several successive articles G have been blown therein, and it may be then continuously used at such high temperature without cooling, or without setting aside for cooling.

As indicated in Fig. 1, the bottom member a may be independently vibrated or tapped, as by tapping the rod b by a second vibrating hammer $h^1$. Ordinarily, however, a single vibrating device will suffice.

Referring to Fig. 2, there is shown a pressing mold in which the glass article $G^1$, as a solid lens for an automobile headlight, or any solid article, is molded by introducing molten glass into the mold member $M^1$ and then pressing downwardly thereon by the pressure member $M^2$, causing the article to take the desired form. Here again the mold structure is vibrated by the hammer h, which supplies the blows to the mold in rapid succession, with the advantageous results above described, to wit, the possibility of working the mold continuously and at high temperature, without need for close regulation or control of its temperature, and without necessity for cooling.

While I have above described my invention as applied to blow molds and pressure molds, it will be understood that my invention is not limited thereto, but is applicable also to paste or charcoal molds, or any other suitable molds.

By preference, the vibration-producing blows succeed each other in rapid succession, as, for example, upwards of one or more per second. For example, sixty or more blows per second may be applied, as when using alternating current to energize the electromagnet system, in which its circuit is maintained closed to the alternating current source and the interrupter contacts i and j are not employed.

The vibrating mechanism may be maintained continuously in operation, if desired, or may be brought into operation during any desired or suitable portion of the complete molding operation as measured from the time of introduction of the glass into the mold to the removal of the molded article therefrom. It is preferred, however, that the vibration of the mold be effected at least during that period of the molding operation in which the glass is in contact with the walls of the mold, and preferably both before and after such period, and during the time the article is being removed from the mold.

What I claim is:

1. The method of molding glassware, which comprises introducing molten glass into a mold and causing it to take the form of the mold, and simultaneously applying to the mold a succession of blows.

2. The method of molding glassware, which comprises introducing molten glass into a mold and causing it to take the form of the mold, and simultaneously vibrating the mold.

3. The method of molding glassware, which comprises introducing molten glass into a mold and causing it to take the form of the mold, and simultaneously applying to the mold a succession of hammer blows.

4. The method of molding glassware, which comprises introducing molten glass into a mold and causing it to take the form of the mold, and simultaneously applying to the mold a series of hammer blows in rapid succession.

5. The method of producing a smooth finish on glassware, which comprises introducing molten glass into a mold and causing it to take the form of the mold, and vibrating the mold while the glass is in contact with the wall of the mold.

6. The method of molding glassware, which comprises introducing molten glass into a mold and causing it to take the form of the mold, vibrating the mold while the glass is in a plastic condition, removing the article from the mold, and thereafter repeating the aforesaid molding operation with vibration a plurality of times notwithstanding rise in temperature of the mold.

7. The method of molding glassware, which comprises introducing molten glass into a hot mold, causing the glass to take the form of the mold, and preventing adhesion of the glass to the heated mold by vibrating the mold while the glass is in a plastic condition.

8. The method of molding glassware, which comprises introducing molten glass into a mold, pressing the glass into contact with the mold wall, and simultaneously vibrating the mold.

9. The method of producing a smooth finish on glassware, which comprises introducing molten glass into a mold, and vibrating the mold while the glass is in a plastic condition.

10. The method of producing a smooth finish on glassware, which comprises introducing molten glass into a heated mold, and vibrating the mold while the glass is in a plastic condition and in contact therewith.

11. The method of producing a smooth finish on glassware, which comprises bringing a mold member into contact with glass in a plastic condition, and vibrating said mold member while in engagement with the glass.

12. The method of molding glassware, which comprises introducing molten glass into a mold and causing it to take the form of the mold, and vibrating said mold while the glass article is being formed and until removed from the mold.

13. The method of molding glassware, which comprises forming a glass article in a press mold, and vibrating said mold while the glass is in a plastic condition.

14. The method of molding glassware, which comprises forming a glass article by pressing it in a press mold, and vibrating said mold while the glass article is being pressed and until removed from the mold.

15. The method of producing a smooth finish on glassware, which comprises forming a glass article within a mold, and effecting vibration between the contacting surfaces of the glass and the mold.

16. The method of molding glassware, which comprises forming a glass article within a mold, and simultaneously effecting vibration between the contacting surfaces of the glass and the mold.

In testimony whereof I have hereunto affixed my signature this 4th day of August, 1922.

JOHN A. MILLIKEN.